(12) United States Patent
Taylor et al.

(10) Patent No.: US 8,402,025 B2
(45) Date of Patent: Mar. 19, 2013

(54) VIDEO QUALITY MEASURES

(75) Inventors: Karen Padham Taylor, Los Gatos, CA (US); Manish Gupta, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 416 days.

(21) Appl. No.: 11/959,871

(22) Filed: Dec. 19, 2007

(65) Prior Publication Data

US 2009/0164419 A1 Jun. 25, 2009

(51) Int. Cl.
*G06F 17/30* (2006.01)
(52) U.S. Cl. ......... 707/736; 707/748; 707/752; 707/769
(58) Field of Classification Search .................. 707/736, 707/752, 748, 769
See application file for complete search history.

(56) References Cited

U.S. PATENT DOCUMENTS

| | | | |
|---|---|---|---|
| 6,269,361 B1 | 7/2001 | Davis et al. | |
| 6,463,585 B1 | 10/2002 | Hendricks et al. | |
| 6,587,127 B1 * | 7/2003 | Leeke et al. | 715/765 |
| 6,611,812 B2 * | 8/2003 | Hurtado et al. | 705/51 |
| 6,917,961 B2 * | 7/2005 | Melet et al. | 709/203 |
| 7,124,125 B2 * | 10/2006 | Cook et al. | 1/1 |
| 8,229,505 B2 * | 7/2012 | Wong | 455/558 |
| 2001/0051996 A1 * | 12/2001 | Cooper et al. | 709/217 |
| 2002/0013826 A1 * | 1/2002 | Hughes et al. | 709/219 |
| 2002/0089534 A1 * | 7/2002 | Siekmann | 345/738 |
| 2003/0067554 A1 | 4/2003 | Klarfeld | |
| 2003/0093792 A1 | 5/2003 | Labeeb et al. | |
| 2003/0220912 A1 | 11/2003 | Fain et al. | |
| 2003/0234865 A1 | 12/2003 | Ali | |
| 2004/0030599 A1 | 2/2004 | Sie et al. | |
| 2004/0051812 A1 * | 3/2004 | Hayward | 348/460 |
| 2005/0097204 A1 | 5/2005 | Horowitz et al. | |
| 2005/0144064 A1 | 6/2005 | Calabria et al. | |
| 2005/0144065 A1 | 6/2005 | Calabria et al. | |
| 2005/0144069 A1 | 6/2005 | Wiseman et al. | |
| 2006/0031214 A1 * | 2/2006 | Solaro et al. | 707/4 |
| 2006/0149721 A1 | 7/2006 | Langford | |
| 2006/0224445 A1 | 10/2006 | Axe et al. | |
| 2006/0256133 A1 | 11/2006 | Rosenberg | |

(Continued)

FOREIGN PATENT DOCUMENTS

| | | |
|---|---|---|
| JP | 10207945 A | 8/1998 |
| JP | 2001229180 A | 8/2001 |

(Continued)

OTHER PUBLICATIONS

U.S. Appl. No. 12/271,395, Liao et al.

(Continued)

*Primary Examiner* — Frantz Coby
(74) *Attorney, Agent, or Firm* — Fish & Richardson P.C.

(57) ABSTRACT

A query including one or more keywords is received from a client device, and a content item (e.g., an advertisement) relevant to the one or more keywords is identified. A video is selected from one or more videos associated with the content item, the selection based on the one or more keywords. Display data is generated for displaying the content item at the client device, and video selection data is generated for displaying the video proximate to the content item at the client device. The display data and the video selection data are provided to the client device.

17 Claims, 8 Drawing Sheets

U.S. PATENT DOCUMENTS

| | | | |
|---|---|---|---|
| 2006/0282328 A1 | 12/2006 | Gerace et al. | |
| 2007/0027754 A1 | 2/2007 | Collins et al. | |
| 2007/0055695 A1* | 3/2007 | Dorai et al. | 707/104.1 |
| 2007/0129995 A1 | 6/2007 | Brandow | |
| 2007/0130159 A1* | 6/2007 | Gulli et al. | 707/10 |
| 2007/0157228 A1 | 7/2007 | Bayer et al. | |
| 2007/0162335 A1 | 7/2007 | Mekikian | |
| 2007/0174872 A1* | 7/2007 | Jing et al. | 725/46 |
| 2007/0226053 A1 | 9/2007 | Carl et al. | |
| 2008/0115211 A1* | 5/2008 | Jogand-Coulomb et al. | 726/21 |
| 2008/0154889 A1 | 6/2008 | Pfeiffer | |
| 2008/0222199 A1 | 9/2008 | Tiu et al. | |
| 2008/0249832 A1 | 10/2008 | Richardson et al. | |
| 2009/0019034 A1* | 1/2009 | Franks et al. | 707/5 |
| 2009/0037262 A1 | 2/2009 | Patil | |
| 2009/0037263 A1 | 2/2009 | Patil | |
| 2009/0043649 A1 | 2/2009 | Wright et al. | |
| 2009/0076886 A1 | 3/2009 | Dulitz et al. | |
| 2009/0089161 A1 | 4/2009 | Ali et al. | |
| 2009/0099909 A1 | 4/2009 | Phan | |
| 2009/0106100 A1 | 4/2009 | Mashinsky | |
| 2009/0119166 A1* | 5/2009 | Taylor et al. | 705/14 |
| 2009/0164419 A1* | 6/2009 | Taylor et al. | 707/3 |
| 2009/0177537 A1* | 7/2009 | Taylor et al. | 705/14 |
| 2010/0082439 A9 | 4/2010 | Patel et al. | |
| 2010/0323763 A1* | 12/2010 | Englebrecht et al. | 455/566 |
| 2011/0026588 A1* | 2/2011 | Boyce | 375/240.02 |

FOREIGN PATENT DOCUMENTS

| | | | |
|---|---|---|---|
| JP | 2002007479 A | 1/2002 | |
| JP | 2002073629 A | 3/2002 | |
| JP | 2003203088 A | 7/2003 | |
| JP | 2005110016 A | 4/2005 | |
| JP | 2005141507 A | 6/2005 | |
| JP | 2007018068 A | 1/2007 | |
| JP | 2007249359 A | 9/2007 | |
| KR | 10 2003 0071591 | 7/2000 | |
| KR | 10-2003-0029410 A | 4/2003 | |
| KR | 10-2000-0036647 | 9/2003 | |
| WO | WO 2004/068299 A2 | 8/2004 | |
| WO | WO 2005/057238 A2 | 6/2005 | |
| WO | WO 2006/062760 A2 | 6/2006 | |
| WO | WO2007079414 A1 | 7/2007 | |

OTHER PUBLICATIONS

PCT/US2008/087175 International Search Report and Written Opinion, Apr. 29, 2009, 13 pages.
PCT/US2008/082519 International Search Report and Written Opinion, Feb. 27, 2009, 12 pages.
PCT International Search Report and The Written Opinion of The International Searching Authority, PCT/US2008/87253, mailed Aug. 26, 2009, 11 pages.
Arrington, Michael, "Google PPC Video Ads—Why I'm Betting Against It", May 23, 2006, TechCrunch, 13 pages.
International Search Report and the Written Opinion of the International Searching Authority, or the Declaration for PCT/US2009/064130 dated May 31, 2010 (11 pages).
Notification Concerning Transmittal of International Preliminary Report on Patentability, PCT/US2008/087175, Jul. 1, 2010, 8 pages.
PCT International Preliminary Report on Patentability, PCT/US2008/082519, May 20, 2010, 7 pages.
PCT International Preliminary Report on Patentability, PCT/US2009/064130, May 26, 2011, 6 pages.
Supplementary EP Search Report, EP08869243, Oct. 21, 2011, 6 pages.
Supplemental EP Search Report for EP08868595.3, dated Aug. 2, 2012, 2 pages.
Notification Concerning Transmittal of International Preliminary Report on Patentability, PCT/US2008/087253, Jul. 22, 2010, 6 pages.
EP Communication for EP08868595.3, dated Aug. 27, 2012, 7 pages.
Australian Patent Examination Report for AU 2008343242, dated Oct. 21, 2012, 3 pages.
Non-Final Office Action (with English translation) for JP 20105397333 dated Nov. 13, 2012, 11 pages.

* cited by examiner

VIDEO QUALITY MEASURES

BACKGROUND

This disclosure relates to information retrieval.

Content items, e.g., advertisements, can be identified by a search engine in response to a query by a user. The query can include one or more search terms, and the search engine can identify and rank the content items based on the search terms, e.g., keywords, in the query and on one or more parameters associated with the content item.

Sometimes a user that submitted the query cannot determine whether the advertisements that are displayed are actually relevant to the user's query. For example, the user may have performed the query to identify a phone to potentially purchase. While an advertisement related to the phone may be identified, the advertisement may not contain enough information for the user to decide if the phone is one that performs the functions the user is interested in using. Additional information, e.g., videos, can thus be presented with the advertisement. The presentation of such additional information, however, can degrade the user experience if the presentation of the additional information causes the advertising space to be cluttered and/or does not provide the user with the choice of receiving such additional information.

SUMMARY

Disclosed herein are systems, apparatus, computer program products and methods for identifying videos associated with advertisements. In an implementation, a query including one or more keywords is received, and a content item relevant to the one or more keywords is identified. A video is selected from one or more videos associated with the content item. Display data and video selection data are provided to a device.

In another implementation, a query including one or more keywords is received, and a content item relevant to the one or more keywords is identified, wherein the content item is associated with videos. Relevancy measures are calculated for the videos based on the one or more keywords, metadata associated with the videos, and quality scores associated with the videos, and a video is selected based on the relevancy measures.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
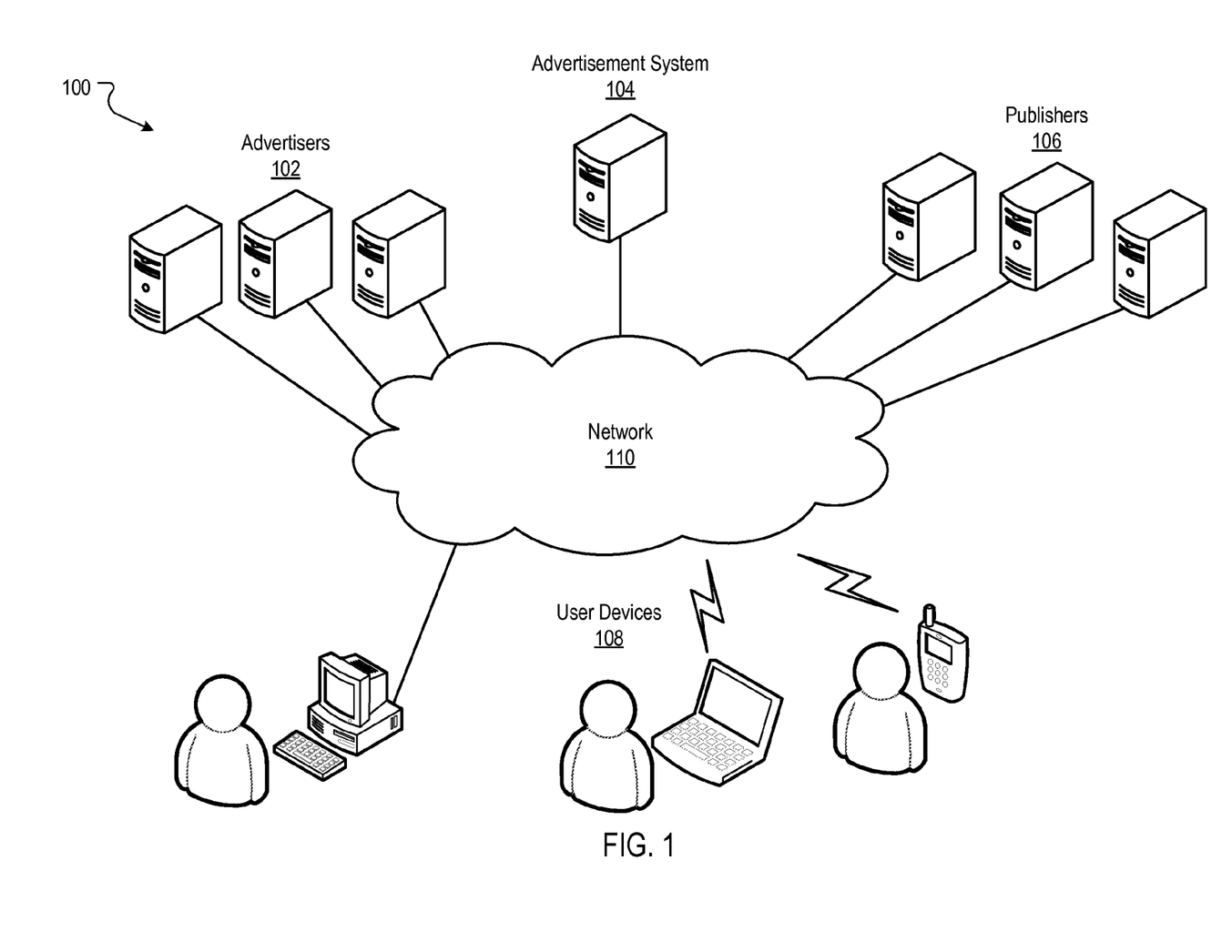
FIG. 1 is a block diagram of an example online content delivery system.

FIG. 1 is a block diagram of an example online content delivery (e.g., advertising) system 100. The system 100 provides sponsored content in response to, for example, a query. By way of example, the sponsored content can be in the form of advertising or advertisements ("ads"). Though the system is described with reference to providing advertisements, the system 100 can provide other forms of content, including other forms of sponsored content.

A computer network 110, such as a local area network (LAN), wide area network (WAN), the Internet, or a combination thereof, connects the advertisers 102, an advertisement system 104, publishers 106, and users devices 108. In some implementations, the one or more advertisers 102 can directly, or indirectly, enter, maintain, and track advertisement ("ad") information in the advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as links, meta-information, and/or machine executable instructions. One or more publishers 106 may submit requests for advertisements to the system 104. The system 104 responds by sending advertisements (e.g., when an associated publication is rendered) to the requesting publisher 106 for placement on one or more of the publisher's web properties (e.g., websites and other network-distributed content). As discussed above, while reference is made to advertisements, other content items can be provided by the system 104.

Other entities, such as user devices 108 and the advertisers 102, can provide usage information to the system 104, such as, for example, whether a click-through related to an advertisement has occurred, whether a conversion has occurred, or whether some other defined event has occurred. Such usage information can be processed to measure performance metrics, such as click-through rates, conversion rates, etc.

A click-through can occur, for example, when a user of a user device 108 selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%. A click-through rate can also be associated with a video advertisement.

A "conversion" occurs when a user, for example, consummates a transaction related to a previously served advertisement. What constitutes a conversion may vary from case to case and can be determined in a variety of ways. For example, a conversion may occur when a user clicks on an advertisement, is referred to the advertiser's Web page and consummates a purchase there before leaving that Web page. Alternatively, a conversion may be defined as a user being shown an advertisement, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product inquiry, etc. Other definitions of what constitutes a conversion are possible.

A conversion rate can be defined as the ratio of the number of conversions to the number of impressions of the advertisement (i.e., the number of times an advertisement is rendered) or the ratio of the number of conversions to the number of selections (or the number of some other earlier event).

Other usage information and/or performance metrics can also be used. The usage information and/or performance metrics can, for example, be revenue related or non-revenue related. In some implementations, the performance metrics can be parsed according to time, e.g., the performance of a particular content item may be determined to be very high on weekends, moderate on weekday evenings, but very low on weekday mornings and afternoons.

This-usage information can include measured or observed user behavior related to advertisements that have been served. The system 104 performs financial transactions, such as crediting the publishers 106 and charging the advertisers 102 based on the usage information.

One example of a publisher 106 is a general content server that receives requests for content (e.g., articles, discussion threads, music, video, graphics, search results, web page listings, information feeds, etc.), and retrieves the requested content in response to the request. The content server may submit a request for advertisements to an advertisement server in the system 104, or embed code in the rendered page for the user device 108 to execute and retrieve the ads. The advertisement request may include a number of advertisements desired. The advertisement request may also include content request information. This information can include the content itself (e.g., page or other content document), a pointer to the content by way of a uniform resource locator ("URL"), a category corresponding to the content or the content request (e.g., arts, business, computers, arts-movies, arts-music, etc.), part or all of the content request, content age; content type (e.g., text, graphics, video, audio, mixed media, etc.), geo-location information, etc.

In some implementations, the content server can combine the requested content with one or more of the advertisements provided by the system 104. In other implementations, a user device 108 executing a browser can combine the requested content with the advertisement. This combined content and advertisements can be sent/presented to the user that requested the content. The content server can transmit information about the advertisements back to the advertisement server, including information describing how, when, and/or where the advertisements are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search service can submit a request for advertisements to the system 104. The request may include a number of advertisements desired. This number may depend on the search results, the amount of screen or page space occupied by the search results, the size and shape of the advertisements, etc. In some implementations, the number of desired advertisements will be from one to ten, or from three to five. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR")scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 104. This combined information can then be forwarded to the user devices 108 that requested the content. The search results can be maintained as distinct from the advertisements, so as not to confuse the user between paid advertisements and neutral search results.

Finally, the search service can transmit information about the advertisement and when, where, and/or how the advertisement was to be rendered back to the system 104.

As can be appreciated from the foregoing, the advertising system 104 can serve publishers 106 such as content servers and search services. The system 104 permits serving of advertisements targeted to content (e.g., documents) served by content servers or in response to search queries provided by users. For example, a network may include an advertisement server serving targeted advertisements in response to requests from a search service with advertisement spots for sale.

In some implementations, the advertisement system 104 may serve advertisements that include a video associated with the advertisements. The video associated with an advertisement may be displayed on the user device 108 when the associated advertisement is displayed. In some implementations, the advertisement can be associated with more than one video, and the video that is the most relevant to a query used to search for the advertisement as well as the most beneficial to the user, is shown to the user. The video can, for example, be selected based on a relevancy measure between the video and keywords used in the search query as well as a quality score associated with the video.

Figure 2:
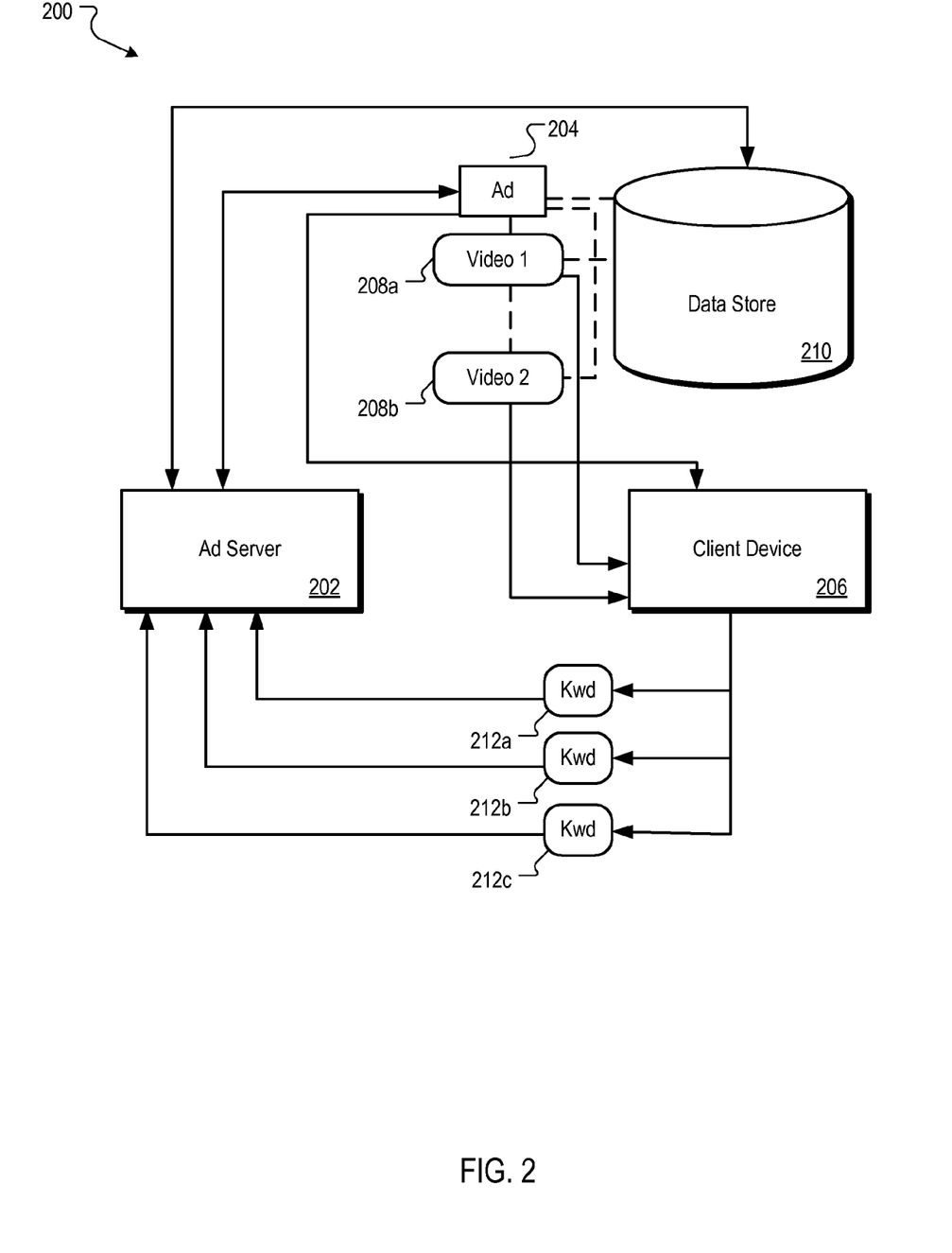
FIG. 2 is a block diagram of an example system that selects videos using relevancy measures and quality scores.

FIG. 2 is a block diagram of an example system 200 that selectively displays a video with an advertisement. The video can be selected from a group of videos based on quality scores associated with the videos as well as relevancy measures between the keywords used in a search query and the metadata associated with the videos. The system 200 can, for example, be implemented in the advertisement system 104 utilizing one or more computing devices that include memory devices storing processing instructions and processing devices for executing the processing instructions. An example computing system is shown and described with reference to FIG. 9. Other implementations, however, can also be used.

In some implementations, the system 200 can include an ad server 202 that serves advertisements 204 to a client device 206. The ad server 202 can serve advertisements provided by the advertisers 102 as part of, or in coordination with, the advertisement system 104. The advertisements may be served over the network 110 and displayed on a client device 206. Example client devices 206, e.g., user device 108, can include a laptop, home computer, PDA, cell phone, set top box, game console, portable electronic device, etc.

In some implementations, the ad server 202 can serve videos 208, e.g., 208a or 208b, to the client device 206. The videos 208 may correspond to the advertisements 204 that are identified by the ad server 202 in response to a query. For example, while the advertisements 204 may be advertisements for potato peelers offered by one or more online merchants that sell potato peelers, the videos 208 associated with the advertisements 204 may be videos on how to use the potato peelers to peel potatoes as well as videos related to using the potato peelers to peel apples.

The advertisements 204 and the videos 208 may be stored in a data store 210 that stores information for advertisements that the ad server 202 can serve. When the client device 206 requests advertisements or issues a search query that results in the identification of advertisements, the ad server 202 can provide the advertisement 204. For example, the advertisement 204 may be an advertisement for a local home goods store. The advertisement 204 can be displayed on the client device 206 as the result of a search for potato peelers (e.g., using a search query "potato peeler") entered in the user's browser.

The system 200 can also select a video from a group of one or more videos 208 associated with the advertisement 204 for display on the client device 206. In some implementations, the system 200 can select a video based on a relevancy measure, quality score, or some other measure of relevance or performance. For example, the video 208 can be a video 208 that other users often played, as demonstrated by a high quality score associated with the video 208. The quality refers to a performance measure that can be based on user interactions. For example, a quality can be a score as measured by CTR, conversion rate, length of play, etc. In some implementations, the quality score can, for example, be based on the length of the video watched and/or number of times the video was viewed.

In one implementation, an ad server 202 can receive a query including one or more keywords 212 from a client device 206. The ad server 202 can identify an advertisement 204 based on the one or more keywords 212. The ad server 202 can, for example, identify the advertisement 204 by comparing the keywords 212 with all advertisements, or a list of keyword associated with the advertisements, to identify the most relevant advertisement 204.

In some implementations, the system 200 can allow an advertiser to specify videos 208 related to the advertisement 204 of the advertiser that may be displayed with that advertiser's advertisements. For example, the advertiser 102 can provide videos 208 to the system 200 to display with the advertisements 204. The videos 208 can, for example, be stored in a data store 210. When the advertisements 204 are displayed, a video still of one of the videos 208 associated with the advertisements 204 as specified by the advertiser 102 and/or a video element such as a plusbox, can be displayed. In some implementations, the video is not displayed initially. The plusbox indicates a video is available. When the user clicks on the video element, e.g., the plusbox, the system 200 can return the selected video 208 associated with the advertisement 204. The display can show the video still of the video 208 associated with the advertisement 204.

In some implementations, the video element can include a video still image of the video 208 or a thumbnail image of the video.

In some implementations, the ad server 202 can evaluate one or more signals associated with each of the videos 208. The signals can, for example, be associated with the user interactions in response to the video element or the video 208 once the video is displayed. For example, the signals can be associated with actions taken by users when the video element or video 208 was previously shown to them. For example, whether the video element such as a video still of the video 208 was clicked on, or the video 208 was muted, played, etc., can be a signal. Each of the signals can be associated with signal scores. The signal scores can represent the weight of the signal in determining the quality scores. In some implementations, the scores can summed or processed in some cumulative manner. The following table is an example of the rates associated with each signal:

|  | Rate |
| --- | --- |
| Click Rate | 10% |
| Play Rate | 10% |
| Pause Rate | 2% |
| Mute Rate | 1% |
| Block Rate | 4% |

In some implementations, when a video element is displayed for a user, the user can decide to click on the video element to view and play the video 208. In some implementations, each click on the video element can be used to calculate the click-through rate associated with the video 208. A click on the video element can, for example, be treated as a positive signal. Each click on the video element can, for example, be associated with a click score of "1." A click rate can be defined as the ratio of the number of clicks to the number of impressions of the video (i.e., the number of times a video is rendered).

In some implementations, the user can play the video 208 by either clicking on a video element associated with the video 208 or selecting a play button associated with the video 208. Playing a video 208 can, for example, be treated as a positive signal. In some implementations, the ad server 202 can determine the length of the video 208 played. The length of the video 208 can be proportional to the signal score. For example, a video 208 played in full can be associated with a score of "10." If only half of the video 208 is played, the signal score is "5," etc. A play rate can be defined as the ratio of the length of the video played to the number of impressions of the video.

In some implementations, pausing or muting audio associated with the video 208 can be treated as negative signals. A pause can, for example, be associated with a score of "−1." Muting a video 208 can, for example, also be associated with a signal score of "−1." The pause rate can be defined as the ratio of the number of times the video 208 is paused to the number of impressions of the video. The mute rate can be defined as the ratio of the number of times the video 208 is muted to the number of impressions of the video.

In some implementations, covering the video 208 with another browser window in the case where the video 208 is displayed in a browser can also be treated as a negative signal. For example, suppose a user selects a video 208 to play.

Subsequently, while the video 208 is playing, the user moves another browser window on top of the video 208 so the video 208 is partially or completely hidden. Each time a video 208 is partially or entirely covered by another object, such as for example, another browser window, the video 208 is can be associated with a signal score of "−1." The block rate can be defined as the ratio of the number of times the video 208 is blocked to the number of impressions of the video.

In some implementations, the video 208 is can be associated with a feature such as a checkout, where the user can purchase the item described in the video. Clicking on the checkout button can also be treated as a positive signal. Specifically, clicking on the checkout button can be associated with the conversion rate of the video 208. The conversion rate, can for example, be one of the signals. For example, each time a click on the video 208 leads to a conversion, the video 208 can be associated with positive signal score, e.g., "3."

In some implementations, the ad server 202 can evaluate the signals associated with the videos 208 and calculate a quality score for each of the videos 208. The quality score can be based on one or more of the signals. For example, the quality score can take into account whether a positive signal or a negative signal is associated with the video 208.

In some implementations, the ad server 202 can use the quality score of the videos 208 as well as a relevancy score calculated for each of the videos 208 in determining which video 208 to display to the user. The relevancy measure can, for example, be based on the relevancy of the keywords 212 with the video 208. In some implementations, an advertiser can provide metadata associated with each of the videos 208. For example, the metadata can describe the subject matter of the specific video 208. For example, if the video 208 is associated with potato peelers, the advertiser can provide as the metadata "potato, peeler, vegetable, cut," etc.

In some implementations, the ad server 202 can calculate the relevancy measure by comparing the keywords 212 with the metadata associated with the videos 208. For example, the ad server 202 can compare the keywords 212 with the metadata provided by the advertiser associated with the video 208. The ad server 202 can determine the relevancy measure by determining, for example, how many of the keywords match the metadata associated with the video 208. For example, for each match between a keyword and metadata, the relevancy measure can be increased. Each match can be further scaled by a feature weight of the metadata, e.g., if the keyword matches metadata describing a business vertical to which the video relates, the match may be scaled by a first scaling factor. Similarly, if the keyword matches metadata describing a particular product brand name to which the video relates, the match may be scaled by a first scaling factor, and the second scaling factor can be greater than the first scaling factor. In some implementations, such scaling factors can be stored as feature vectors, and each keyword match can be stored in a relevancy vector. The overall relevancy of the video to the keyword(s) can be obtained by a dot product of the feature vector and the relevancy vector.

In other implementations, the ad server 202 can calculate the relevancy measure by comparing the keywords 212 with audio associated with the video 208. For example, the ad server 202 can extract the audio associated with the videos 208 and then compare the audio with the keywords 212. The audio and the keywords 212 can be compared, and based on the comparison and how much of the audio matches the keywords 212, the ad server 202 can calculate the relevancy measure.

The ad server 202 can select one of the videos 208 based on the quality scores and relevancy measures. In some implementations, the ad server 202 can calculate a final score by combining the quality scores and the relevancy measures. For example, the ad server 202 can use the formula Quality score * Relevancy measure to determine the Final Score and select the video 208 based on the highest Final Score.

For example, suppose that a user performs a query "using potato peelers to peel potatoes." The ad server 202 selects advertisement 204 as one of the advertisements to display to the user. Advertisement 204 is associated with two videos. Video 1 is a video describing how to use the potato peeler to peel potatoes and is associated with the metadata "potato peeler peel." Video 2 is a video describing how to use the potato peeler to peel apples and is associated with the metadata "peeler peel apple" as provided by the advertiser associated with the advertisement 204. The following table describes the signals associated with each video, as well as the rates of each signal.

|  | Video 1 | Video 2 |
| --- | --- | --- |
| Click Rate | 4% | 1% |
| Play Rate | 2% | 6% |
| Pause Rate | 1% | 0% |
| Mute Rate | 1% | 0% |
| Block Rate | 2% | 6% |

The ad server 202 can calculate the quality score of each video by adding each of the individual signal scores. Each of the negative signals, e.g., pause rate, mute rate, block rate, can be associated with a negative rate in the calculation of the quality score. Therefore, in this example, the quality score of Video 1 can be calculated as "0.04+0.02+−0.01+−0.01+−0.02=0.02," and the quality score of Video 2 can be calculated as "0.06+0.01+0+0+−0.06=0.01."

The ad server 202 can also calculate the relevancy measure based on comparing the keywords "using potato peelers to peel potatoes" with the metadata of Video 1 "potato peeler peel," and the metadata of Video 2 "peeler peel apple." The ad server 202 can, for example, determine which video is associated with metadata that matches with a higher number of keywords. The ad server 202 can, for example, assign a value for each keyword that matches the metadata. For example, Video 1's metadata matches the key words "potato," "peeler," and "peel." Video 2's metadata matches the keywords "peeler" and "peel." Therefore, Video 1 is associated with a relevancy measure of "3" because three of the keywords match the metadata associated with video 1. Video 2 is associated with the relevancy measure of "2" because two of the keywords match the metadata associated with Video 2.

The ad server 202 can then calculate a final score by, for example, multiplying the quality score by the relevancy measure of each video 208. Therefore, the final scores can be calculated as follows:

$$\text{Final\_score\_Video\_1} = 0.02 * 3 = 0.06$$

$$\text{Final\_score\_Video\_2} = 0.01 * 2 = 0.02$$

The ad server 202 can then select the video 208 with the highest final score as the video 208 to display with the advertisement. In this example, the ad server 202 can select Video 1 because Video 1's final score of "0.06" is higher than Video 2's final score of "0.02."

In some implementations, the video 208 can be associated with a "label" that describes the video element. A label is a selectable element that includes a textual description or some other indicator of an action associated with the selection of the label. For example, the label can recite "watch video." The ad server 202 can associate different labels with the videos 208 and determine which label performs better. For example, a video 208 with "watch video" as the label may get more clicks and more views than the same video 208 with "PLAY ME!" as the label. The ad server 202 can evaluate the performance of the labels associated with each video 208 and select the best performing label to show with the selected video 208.

In other implementations, the video 208 can be associated with a thumbnail image. In some implementations, the thumbnail can be a selected still from the video 208. In other implementations, the thumbnail could be a different image that is related to the subject matter of the video 208. For example, the video about the potato peelers can be associated with an image of an actual potato peeler. The ad server 202 can associate different thumbnail images with the videos and determine which thumbnail image performs the best. For example, the performance can be measured according to the click-through rate of the video 208. Therefore, if a video is clicked, the performance of the thumbnail image can increase. The ad server 202 can evaluate the performance of each of the thumbnail images associated with each video and select the best performing thumbnail to show with the selected video.

In summary, the system 200 of FIG. 2 can facilitate the provisioning of advertisements and related videos 208 in a variety of ways. For example, a client device 206 can send a query including one or more keywords to ad server 202. The ad server 202 can use the keywords to find an advertisement from a data store 210. The ad server 202 can determine whether videos 208 are associated with the advertisement. The ad server 202 can compare the keywords with the metadata associated with the videos 208, for example, and calculate a relevancy measure between the keywords and each of the videos 208. The ad server 202 can then calculate a quality score for each of the videos 208 and select one of the videos based on the relevancy measure and the quality score. The ad server 202 can then send the advertisement and the video 208 to the client device 206. The client device 206 can display the advertisement and a video element associated with the video 208 to display the video.

Figure 3:
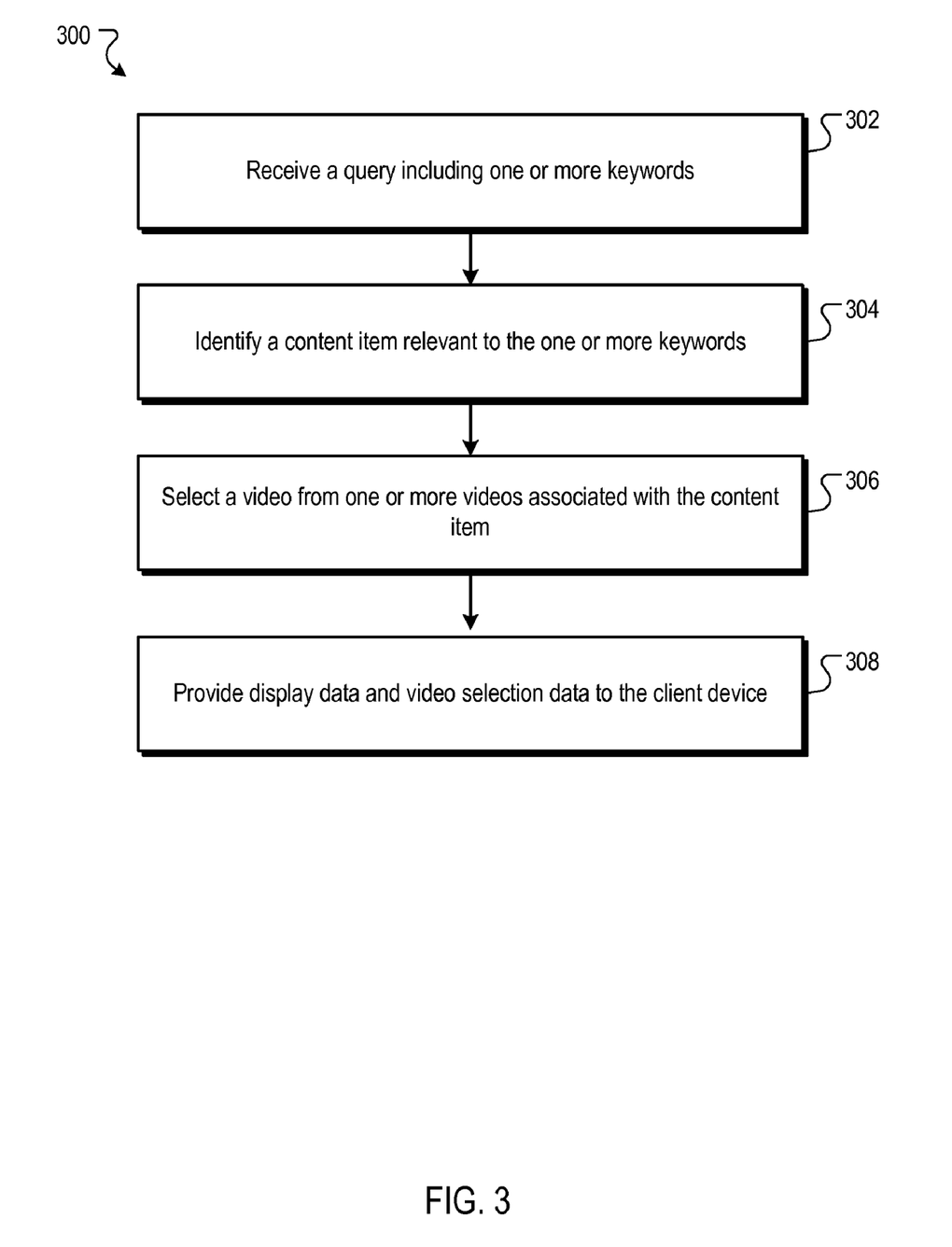
FIG. 3 is a flow diagram of an example process for identifying advertisements and videos associated with the advertisements in response to a query.

FIG. 3 is a flow diagram of an example 300 process for identifying advertisements and videos associated with the advertisements in response to a query. The process 300 can, for example, be implemented in a system such as the system 200 of FIG. 2.

Stage 302 receives from a client device a query including one or more keywords. For example, referring to FIG. 2, the query may be a search query, such as "potato peelers," that the user enters on a browser on the client device 206 and which is transmitted over a network to the ad server 202.

Stage 304 identifies an advertisement relevant to the one or more keywords. For example, the ad server 202 can identify an advertisement relevant to the one or more keywords. The advertisement can, for example, be an advertisement for a local home goods store that sells potato peelers.

Stage 306 selects a video from one or more videos associated with the advertisement. The selection can, for example, based on the one or more keywords. For example, the ad server 202 can select a video from one or more videos associated with the advertisement, the selection based on the one or more keywords. The video can, for example, include a video on how to use a potato peeler that can be purchased at the home goods store. The ad server 202 can, in one implementation, generate display data for displaying the advertisement at the client device 206, and also generate video selection data for displaying the video proximate to the advertisement at the client device. For example, the ad server 202 can generate video selection data for displaying the video of how to use the potato peeler proximate to the home goods store advertisement at the client device 206.

Stage 308 provides the display data and the video selection data to the client device. For example, the ad server 202 can provide the display data and the video selection data to the client device 206.

Figure 4:
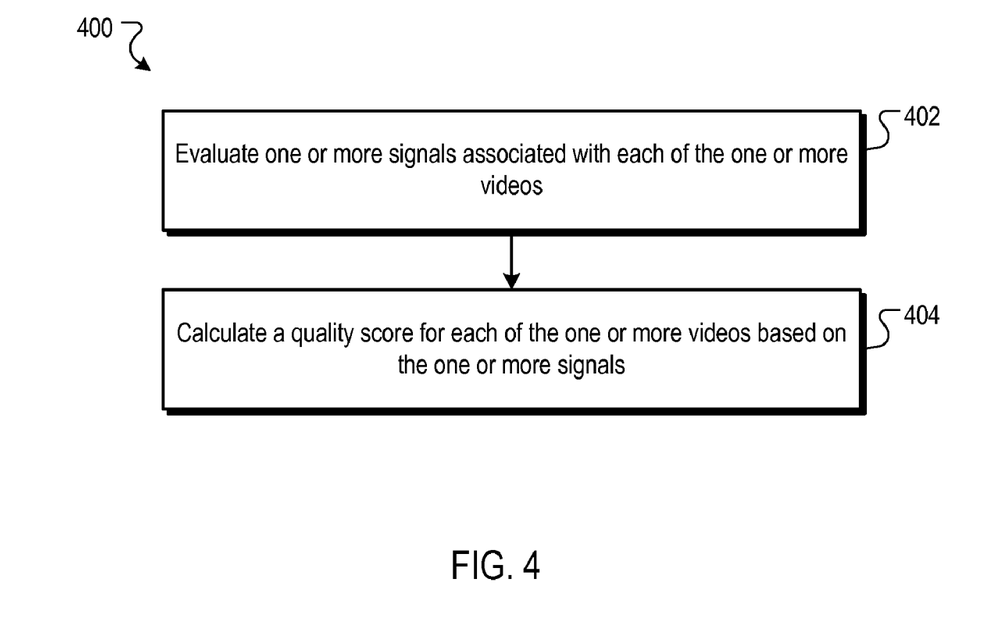
FIG. 4 is a flow diagram of an example process for calculating quality scores based on signals.

FIG. 4 is a flow diagram of an example process 400 for calculating quality scores based on signals. The process 400 can, for example, be implemented in a system such as the system 200 of FIG. 2.

Stage 402 evaluates one or more signals associated with each of one or more videos associated with an advertisement. For example, the ad server 202 can evaluate one or more signals associated with each of the one or more videos. The signals can, for example, include how many times each video was clicked, played, paused, or muted, and the resulting overall rates related to these measures.

Stage 404 calculates a quality score for each of the one or more videos based on the one or more signals. For example, the ad server 202 can calculate a quality score for each of the one or more videos based on the one or more signals. In some implementations, some signal may be weighted more than other signals. For example, a "stop play" signal may have negative weight of a higher magnitude scale than a "start play" signal weight, as the "stop play" signal can be interpreted as users that actually watch the video of displeased, offended, or may otherwise find the video to be uninteresting.

Figure 5:
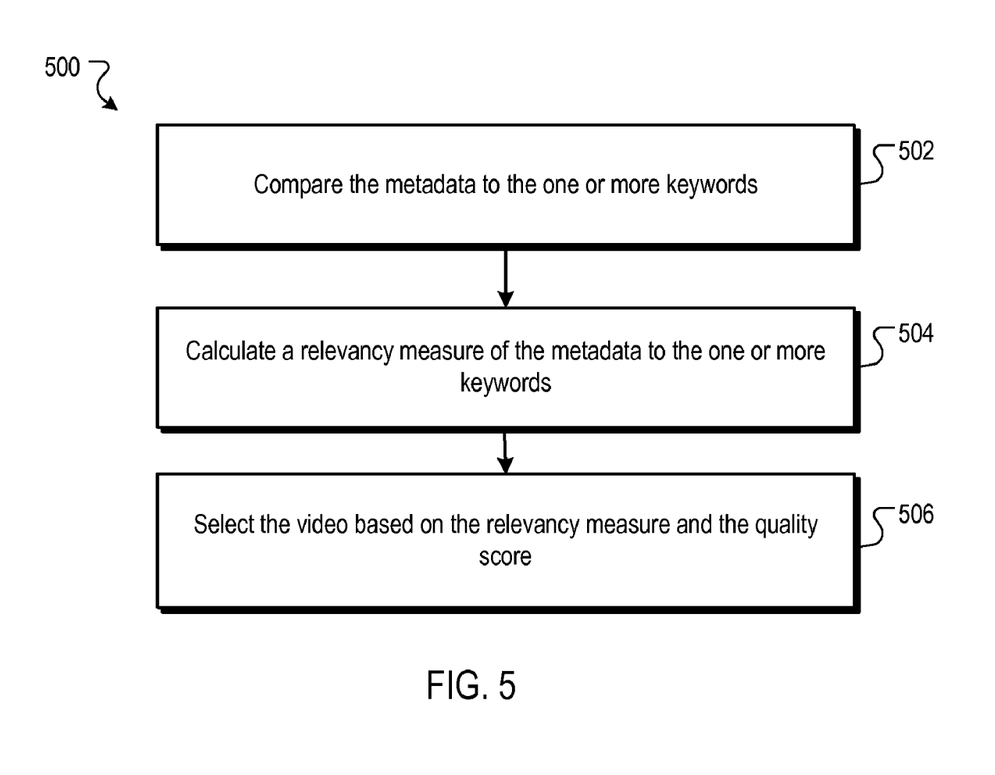
FIG. 5 is a flow diagram of an example process for selecting a video from a group of one or more videos associated with the advertisement based on the one or more keywords.

FIG. 5 is a flow diagram of an example process 500 for selecting a video from a group of one or more videos associated with the advertisement based on the one or more keywords. The process 500 can, for example, be implemented in a system such as the system 200 of FIG. 2.

Stage 502 compares metadata associated with a video to the one or more keywords. For example, the ad server 202 can compare the metadata to the one or more keywords.

Stage 504 calculates a relevancy measure of the metadata to the one or more keywords. For example, the ad server 202 can calculate a relevancy measure of the metadata to the one or more keywords.

Stage 506 selects a video based on the relevancy measure and the quality score. For example, the ad server 202 can select the video based on the relevancy measure and the quality score.

Figure 6:
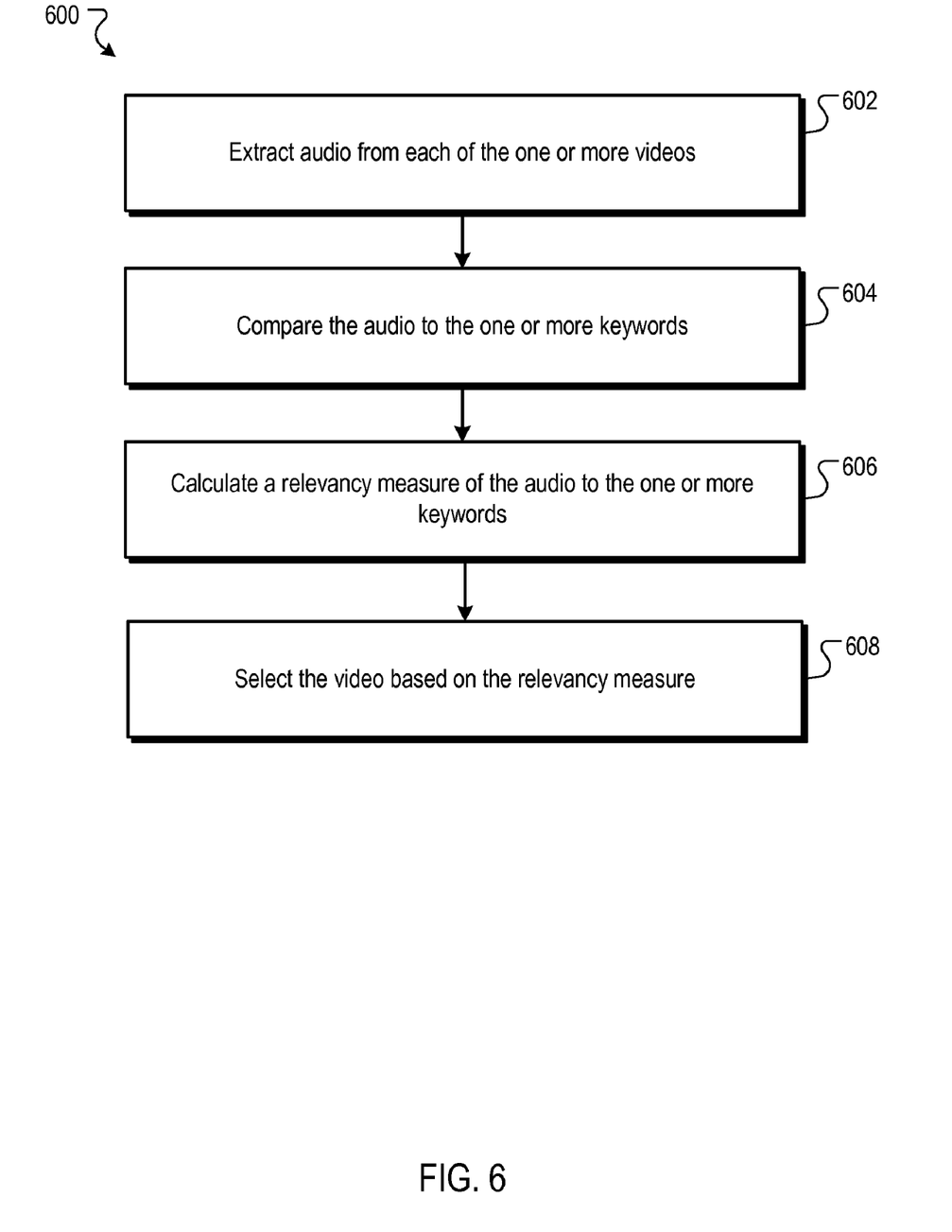
FIG. 6 is another flow diagram of an example process for selecting a video from a group of one or more videos associated with the advertisement based on the one or more keywords.

FIG. 6 is another flow diagram of an example process for selecting a video from a group of one or more videos associated with the advertisement based on the one or more keywords. The process 600 can, for example, be implemented in a system such as the system 200 of FIG. 2.

Stage 602 extracts audio from each of the one or more videos. For example, the ad server 202 can extract audio from each of the one or more videos. Extraction can include extraction of the audio or text that is associated with the audio.

Stage 604 compares the audio to the one or more keywords. For example, the ad server 202 can compare audio to the one or more keywords.

Stage 606 calculates a relevancy measure of the audio to the one or more keywords. For example, the ad server 202 can calculate a relevancy measure of the audio to the one or more keywords.

Stage 608 selects a video based on the relevancy measure. For example, the ad server 202 can select the video based on the relevancy measure.

Figure 7:
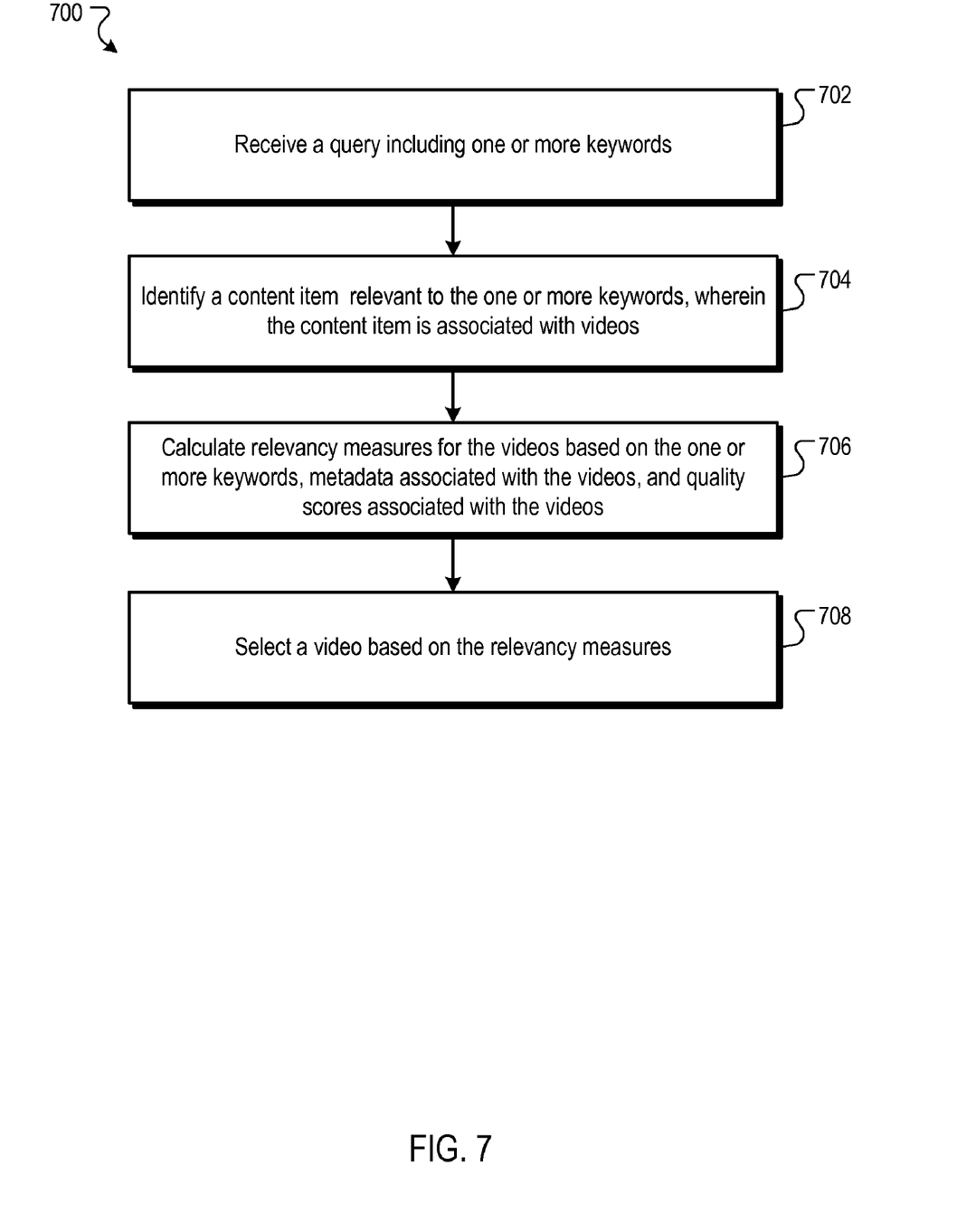
FIG. 7 is another flow diagram of an example process for identifying advertisements and videos associated with the advertisements in response to a query.

FIG. 7 is another flow diagram of an example process for identifying advertisements and videos associated with the advertisements in response to a query. The process 700 can, for example, be implemented in a system such as the system 200 of FIG. 2.

Stage 702 receives a query including one or more keywords from a client device. For example, the ad server 202 can receive a query including one or more keywords from a client device.

Stage 704 identifies an advertisement relevant to the one or more keywords and which is associated with videos. For example, the ad server 202 can identify an advertisement relevant to the one or more keywords, wherein the advertisement is associated with videos.

Stage 706 calculates relevancy measures for the videos based on the one or more keywords, metadata associated with the videos, and quality scores associated with the videos. For example, the ad server 202 can calculate relevancy measures for the videos based on the one or more keywords, metadata associated with the videos, and quality scores associated with the videos.

Stage 708 selects a video based on the relevancy measures. For example, the ad server 202 can select a video based on the relevancy measures.

Figure 8:
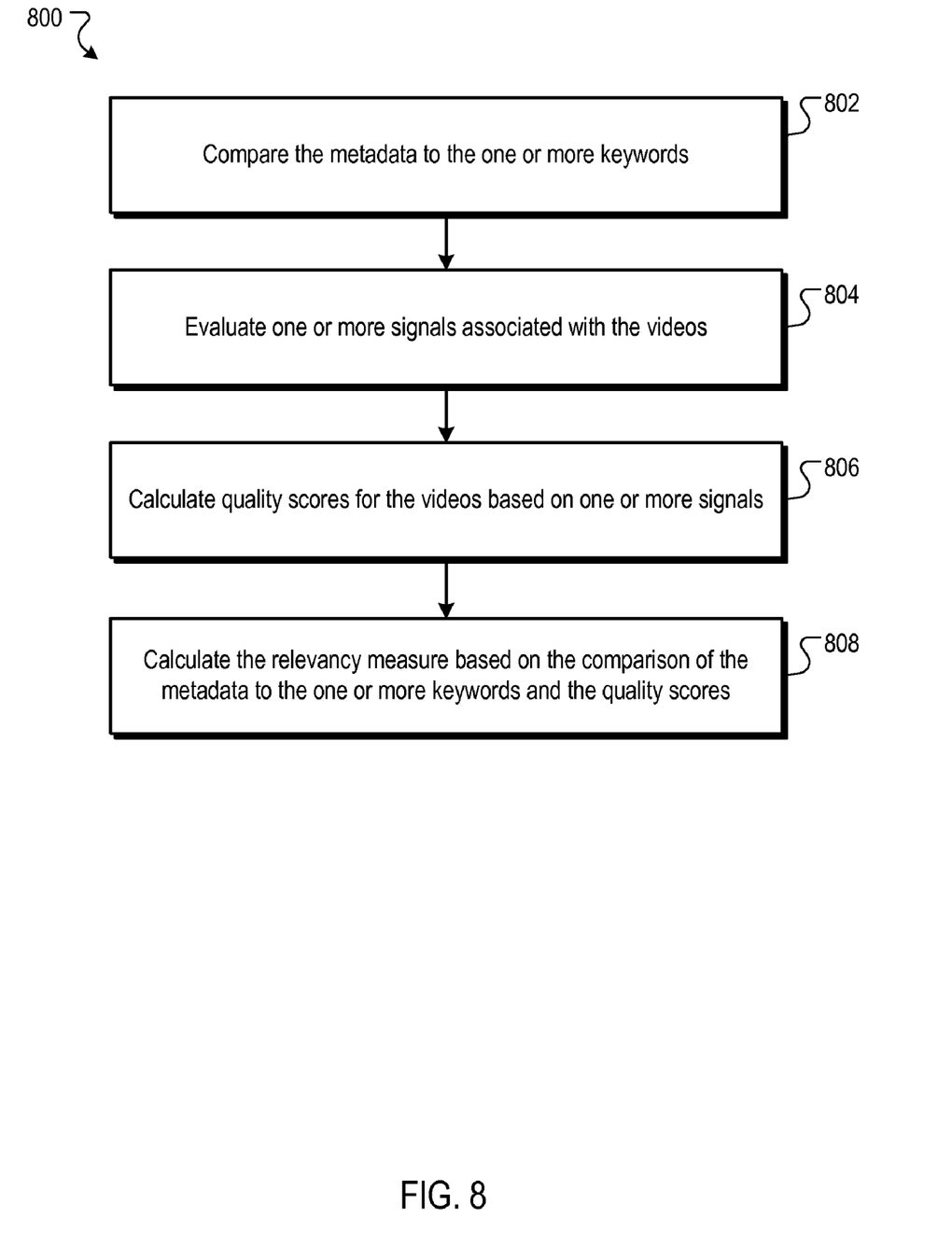
FIG. 8 is a flow diagram of an example process for calculating relevancy measures for the videos based on the one or more keywords.

FIG. 8 is a flow diagram of an example process for calculating relevancy measures for the videos based on the one or more keywords. The process 800 can, for example, be implemented in a system such as the system 200 of FIG. 2.

Stage 802 compares metadata associated with a given video to the one or more keywords. For example, the ad server 202 can compare the metadata to the one or more keywords.

Stage 804 evaluates one or more signals associated with the videos. For example, the ad server 202 can evaluate one or more signals associated with the videos.

Stage 806 calculates quality scores for the videos based on one or more signals. For example, the ad server 202 can calculate quality scores for the videos based on one or more signals.

Stage 808 calculates the relevancy measure based on the comparison of the metadata to the one or more keywords and the quality scores. For example, the ad server 202 can calculate the relevancy measure based on the comparison of the metadata to the one or more keywords and the quality scores.

Figure 9:
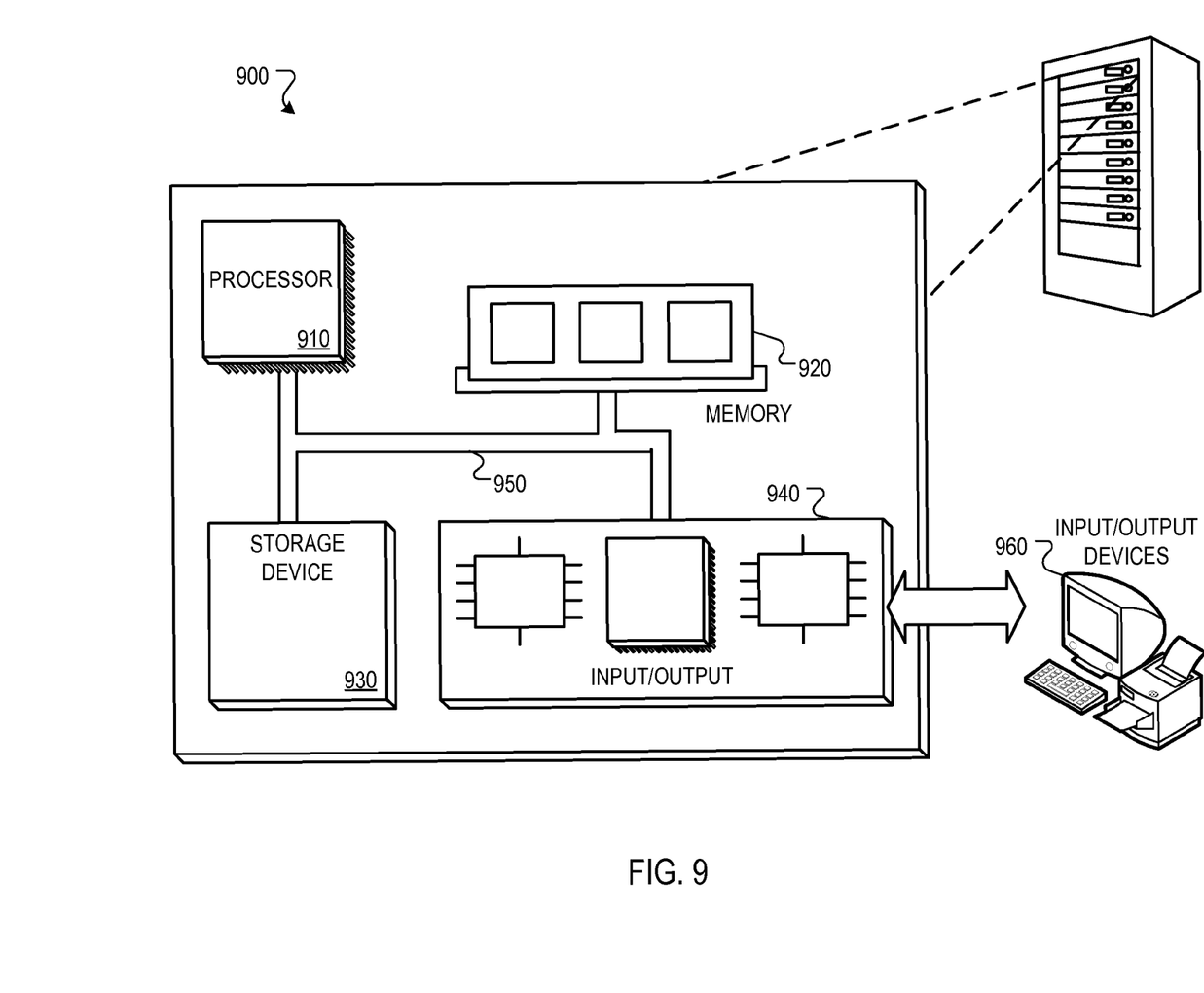
FIG. 9 is a schematic diagram of an example computer system that can be utilized to implement the systems and methods described herein.

FIG. 9 is a schematic diagram of an example computer system 900 that can be utilized to implement the systems and methods described herein. The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In some implementations, the processor 910 is a single-threaded processor. In other implementations, the processor 910 is a multi-threaded processor. The processor 910 is capable of processing instructions stored in the memory 920 or on the storage device 930.

The memory 920 stores information within the system 900. In some implementations, the memory 920 is a computer-readable medium. In other implementations, the memory 920 is a volatile memory unit. In still other implementations, the memory 920 is a non-volatile memory unit.

The storage device 930 is capable of providing mass storage for the system 900. In some implementations, the storage device 930 is a computer-readable medium. In various different implementations, the storage device 930 can, for example, include a hard disk device, an optical disk device, or some other large capacity storage device.

The input/output device 940 provides input/output operations for the system 900. In some implementations, the input/output device 940 can include one or more network interface devices, e.g., an Ethernet card, a serial communication device, e.g., and a RS-232 port, and/or a wireless interface device, e.g., and an 802.11 card. In other implementations, the input/output device can include driver devices configured to receive input data and send output data to other input/output devices, e.g., keyboard, printer and display devices 960. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used.

Furthermore, the features and methods described can also be used in another form of online advertising such as ad syndication, which allows advertisers to extend their marketing reach by distributing advertisements to additional partners. For example, third party online publishers can place an advertiser's text or image advertisements on web properties with desirable content to drive online customers to the advertiser's website. An example of such a system is AdSense™ offered by Google, Inc. The features and methods described above can be used to allow the display of video elements along with the advertisements placed on the publisher's websites.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:

receiving, from a client device, a query including one or more keywords;

identifying a content item from a content item provider as being relevant to the one or more keywords;

accessing association data, specified by the content item provider, describing an association of a plurality of videos with the content item, the association data specifying each of the plurality of videos as being related to the content item, and further specifying that each of the plurality of videos may be displayed with the content item, wherein each of the plurality of videos is associated with metadata specific to the video;

for each video of the plurality of videos, calculating a score for the video, wherein the calculating comprises:

calculating a relevancy measure for the video based upon the one or more keywords matching metadata associated with the video; and increasing the relevancy measure for each keyword match to the metadata by an amount proportionate to a feature weight of the matched metadata;

selecting a video from the plurality of videos associated with the content item based on the respective scores for the videos;

generating display data for displaying the content item at the client device;

generating video selection data for displaying the video proximate to the content item at the client device; and providing the display data and the video selection data to the client device.

2. The method of claim 1, wherein the video selection data causes the device to display a video element and causes the device to display the video associated with the content item proximate to the content item in response to a selection of the video element.

3. The method of claim 1, wherein calculating a score for the video further comprising:
evaluating one or more signals associated with the video, the signals being representative of past user interactions in response to the video; and
calculating a quality score for the video based on the one or more signals.

4. The method of claim 3, wherein the one or more signals include one or more of a play percentage; a pause percentage; a hidden percentage; a muted percentage; a conversion rate; and/or an information display rate.

5. The method of claim 1, further comprising:
receiving the metadata from a content provider associated with each of the plurality of videos.

6. The method of claim 1, wherein calculating a relevancy measure for the video based upon the one or more keywords matching metadata associated with the video comprises:
extracting audio from each of the videos;
comparing the audio to the one or more keywords; and
calculating the relevancy measure of the video based on a matching of the audio to the one or more keywords.

7. The method of claim 1, wherein metadata specific to a corresponding video specify a subject matter of the corresponding video.

8. A computer-implemented method, comprising:
receiving, from a client device, a query including one or more keywords;
identifying a content item from a content item provider as being relevant to the one or more keywords;
accessing association data, specified by the content item provider, describing an association of a plurality of videos with the content item, the association specifying each of the plurality of videos as being related to the content item, and further specifying that each of the plurality of videos may be displayed with the content item, wherein each of the plurality of videos is associated with metadata specific to the video;
for each video of the plurality of videos:
calculating relevancy measures for the videos based on the one or more keywords and the metadata associated with the video and increasing the relevancy measures for each keyword match to the metadata by an amount proportionate to a feature weight of the matched metadata;
calculating a quality score for the video based upon signals associated with the video, the signals representative of past user interactions in response to the video;
calculating a final score for the video, the final score based on the product of the relevancy measure for the video and the quality score for the video; and
selecting a video based on the final scores.

9. The method of claim 8, wherein the signals representative of past user interactions include one or more of a play percentage; a pause percentage; a hidden percentage; a muted percentage; a conversion rate; and/or an information display rate.

10. A system, comprising:
a data store configured to store advertisements and, for each advertisement, a corresponding plurality of videos associated with the advertisement, the association specifying each of the plurality of videos as being related to the advertisement, and further specifying that each of the plurality of videos may be displayed with the advertisement; and
an advertisement engine comprising instruction executable by a processing system and stored in a computer readable medium, wherein upon execution the instructions cause the processing system to perform the operations of:
receiving from a client device a query including one or more keywords;
identifying an advertisement from an advertiser relevant to the one or more keywords;
for each of the plurality of videos associated with the advertisement:
calculating a relevancy measure for the video based upon the one or more keywords matching metadata associated with the video;
calculating a score for the video based on a product of the relevancy measure and a quality score for the video;
selecting a video from the plurality of videos associated with the advertisement based on the respective scores for the videos, wherein the advertiser specifies the plurality of videos as being associated with the advertisement and that each of the plurality of videos may be displayed with the advertisement;
generating display data for displaying the advertisement at the client device;
generating video selection data for displaying the video proximate to the advertisement at the client device; and
provide the display data and the video selection data to the client device.

11. The system of claim 10, wherein the video selection data causes the client device to display a video element and causes the client device to display the video associated with the advertisement proximate to the advertisement in response to a selection of the video element.

12. The system of claim 10, wherein the the operation of calculating a score for the video comprises: evaluating one or more signals associated with the video, the signals being representative of past user interactions in response to the video; and
calculating the quality score for the video based on the one or more signals.

13. The system of claim 12, wherein the signals associated with the video include one or more of a play percentage; a pause percentage; a hidden percentage; a muted percentage; a conversion rate; and/or an information display rate.

14. The system of claim 10, wherein the operation of calculating a relevancy measure for the video based upon the one or more keywords matching metadata associated with the video comprises:

increasing the relevancy measure for each keyword match to the metadata by an amount proportionate to a feature weight of the matched metadata.

15. A system, comprising:
a data store configured to store advertisements and videos associated with the advertisements; and
an advertisement engine comprising instruction executable by a processing system and stored in a computer readable medium, wherein upon execution the instructions cause the processing system to perform the operations of:
receiving, from a client device, a query including one or more keywords from a client device;
identify an advertisement from an advertisement provider as being relevant to the one or more keywords;
accessing association data, specified by the advertisement provider, describing an association of a plurality of videos with the advertisement, the association specifying each of the plurality of videos as being related to the advertisement, and further specifying that each of the plurality of videos may be displayed with the advertisement;
for each of the plurality of videos:
  calculating relevancy measures for the video based on the one or more keywords matching metadata associated with the video, wherein calculating the relevancy measures comprises increasing the relevancy measures for each keyword match to the metadata by an amount proportionate to a feature weight of the matched metadata;
  calculating a quality score for the video based upon signals associated with the video, the signals representative of past user interactions in response to the video;
  calculating a final score for the video, the final score based on the product of the relevancy measure for the video and the quality score for the video; and
selecting a video from the plurality of videos associated with the advertisement based on the final scores.

16. A system, comprising:
means for receiving a query including one or more keywords;
means for identifying a content item from a content item provider as being relevant to the one or more keywords, the content item associated with a plurality of videos by the content item provider, the association specifying each of the plurality of videos as being related to the content item and that may be displayed with the content item;
means for generating a relevancy measure for each of the videos based on the one or more keywords matching metadata associated with the video;
means for increasing the relevancy measures for each keyword match to the metadata by an amount proportionate to a feature weight of the matched metadata;
means for generating a quality score for each of the videos;
means for generating a final score for each of the videos, each final score based on a product of a respective relevancy measure and quality score for a video;
means for selecting a video from the plurality of videos based on final scores;
means for generating display data for displaying the content item at a client device;
means for generating video selection data for displaying the video proximate to the content item at the client device; and
means for providing the display data and the video selection data to the client device.

17. Software stored in a computer memory device accessible by a data processing apparatus that upon such execution cause the data processing apparatus to perform operations comprising:
receiving, from a client device, a query including one or more keywords;
identifying a content item from a content item provider as being relevant to the one or more keywords;
accessing association data, specified by the content item provider, describing an association of a plurality of videos with the content item, the association data specifying each of the plurality of videos as being related to the content item, and further specifying that each of the plurality of videos may be displayed with the content item, wherein each of the plurality of videos is associated with metadata specific to the video;
for each video of the plurality of videos, calculating a score for the video, wherein the calculating comprises:
  calculating a relevancy measure for the video based upon the one or more keywords matching metadata associated with the video; and
  increasing the relevancy measure for each keyword match to the metadata by an amount proportionate to a feature weight of the matched metadata;
selecting a video from the plurality of videos associated with the content item based on the respective scores for the videos;
generating display data for displaying the content item at the client device;
generating video selection data for displaying the video proximate to the content item at the client device; and
providing the display data and the video selection data to the client device.

* * * * *

UNITED STATES PATENT AND TRADEMARK OFFICE
CERTIFICATE OF CORRECTION

PATENT NO. : 8,402,025 B2
APPLICATION NO. : 11/959871
DATED : March 19, 2013
INVENTOR(S) : Karen Padham Taylor It is certified that error appears in the above-identified patent and that said Letters Patent is hereby corrected as shown below:

In the Claims:

In Claim 3, Line 20, Column 13, delete "comprising:" and insert -- comprises: --, therefor.

In Claim 8, Line 58, Column 13, delete "videos" and insert -- video --, therefor.

In Claim 10, Line 19, Column 14, delete "instruction" and insert -- instructions --, therefor.

In Claim 10, Line 46, Column 14, delete "provide" and insert -- providing --, therefor.

In Claim 12, Line 53, Column 14, after "the" delete "the".

In Claim 15, Line 13 (Approx.), Column 15, delete "identify" and insert -- identifying --, therefor.

Signed and Sealed this
Twenty-eighth Day of May, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,402,025 B2 | Page 1 of 1 |
| APPLICATION NO. | : 11/959871 | |
| DATED | : March 19, 2013 | |
| INVENTOR(S) | : Taylor et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this
Sixteenth Day of December, 2014

Michelle K. Lee
*Deputy Director of the United States Patent and Trademark Office*